Figure 1:
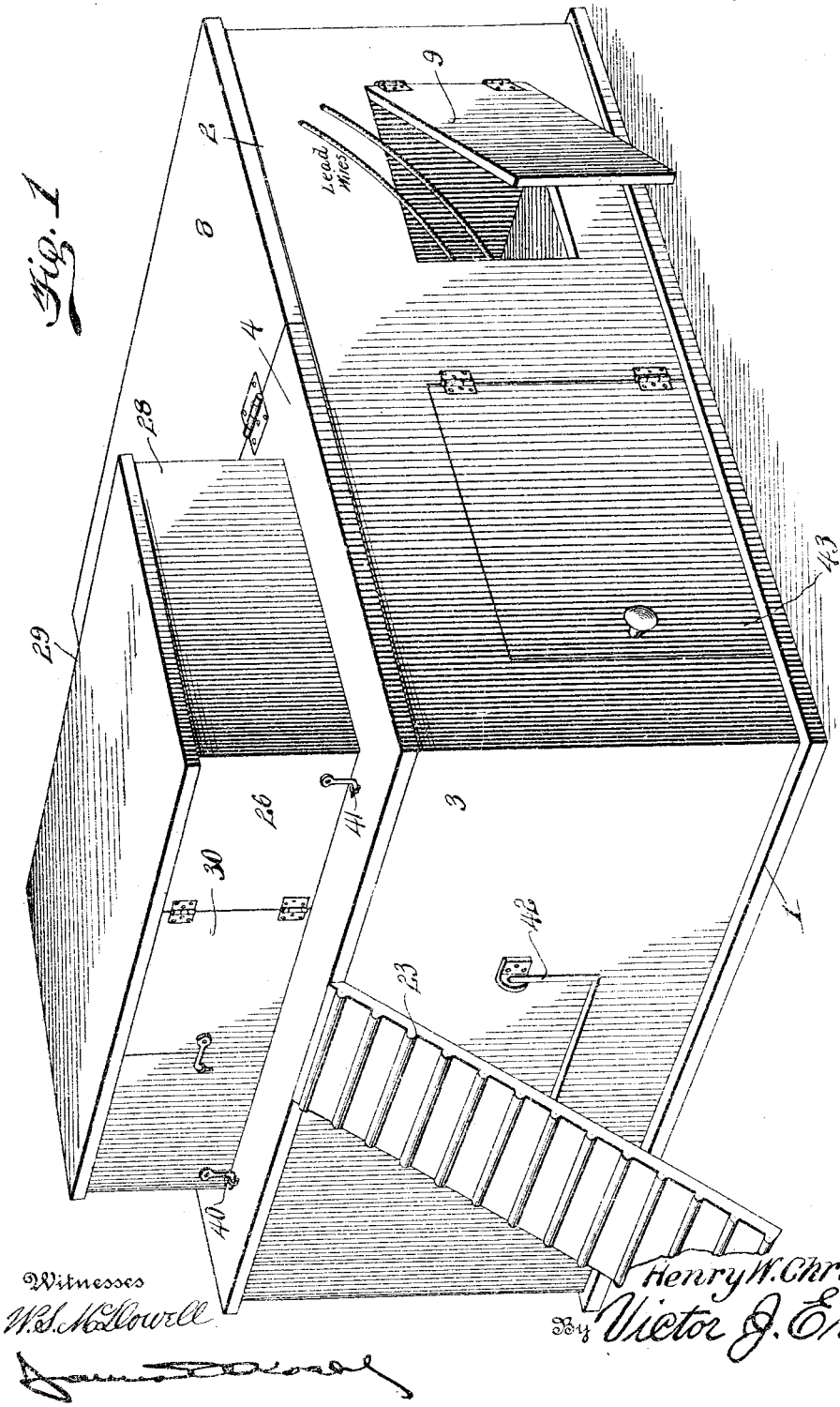

H. W. CHRISTMAN.
ANIMAL TRAP.
APPLICATION FILED JULY 19, 1911.

1,034,978.

Patented Aug. 6, 1912.

3 SHEETS—SHEET 1.

Witnesses

Inventor
Henry W. Christman
By Victor J. Evans
Attorney

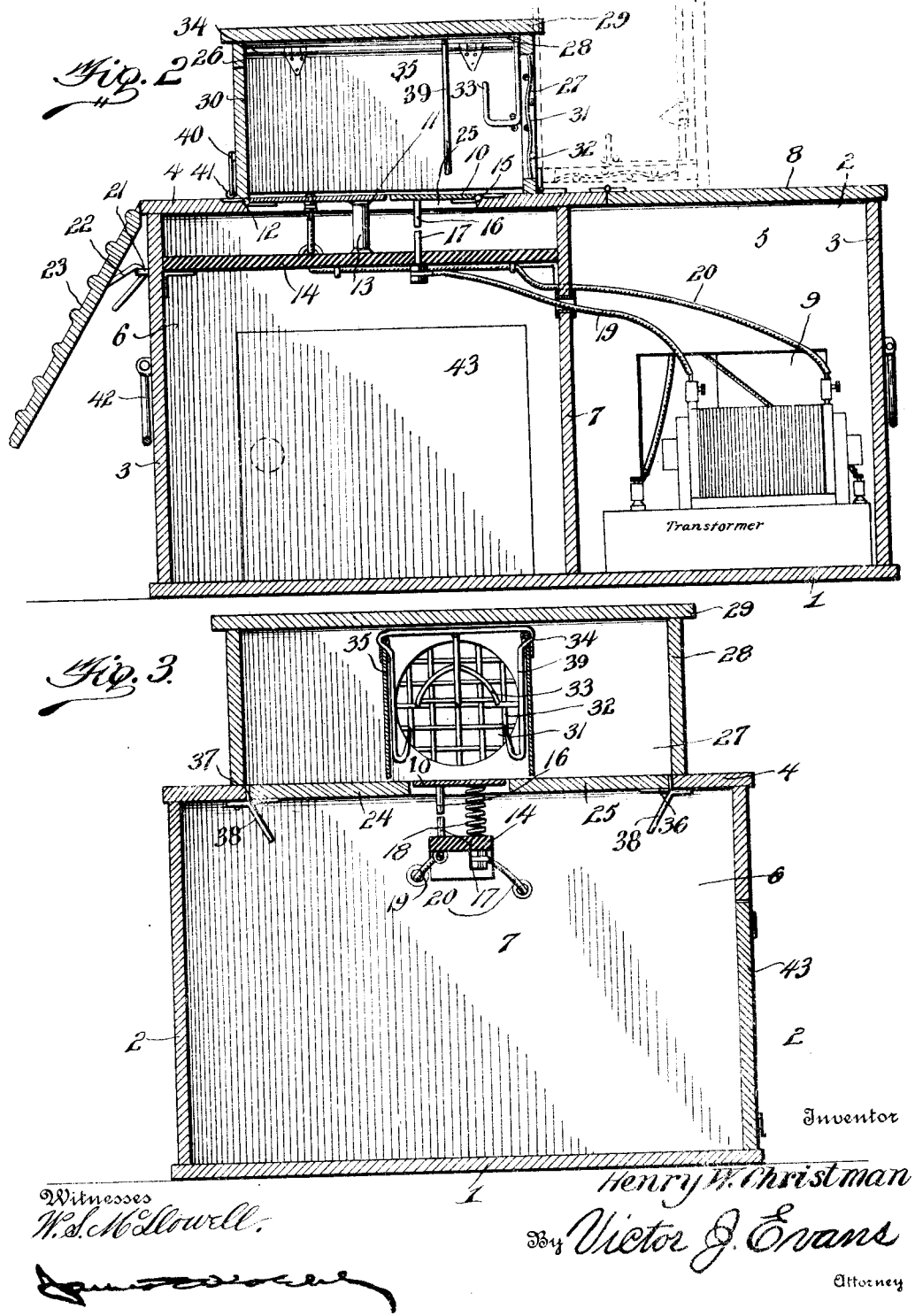

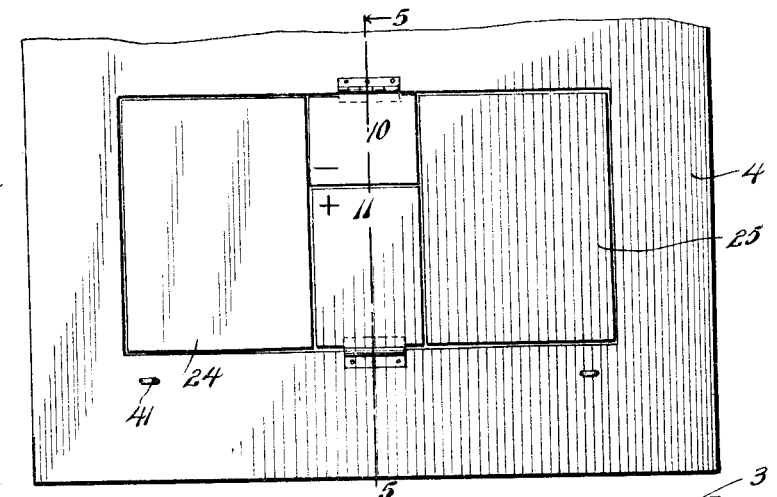
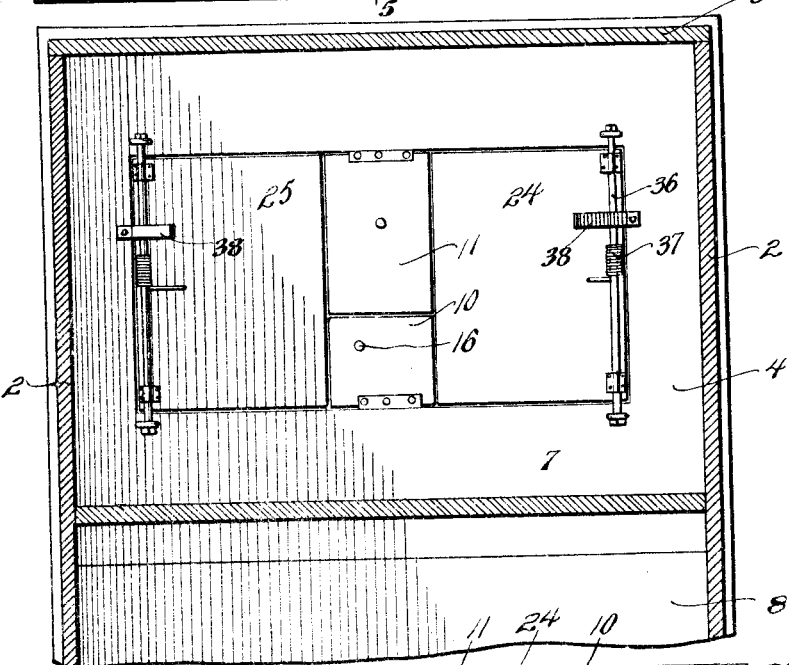
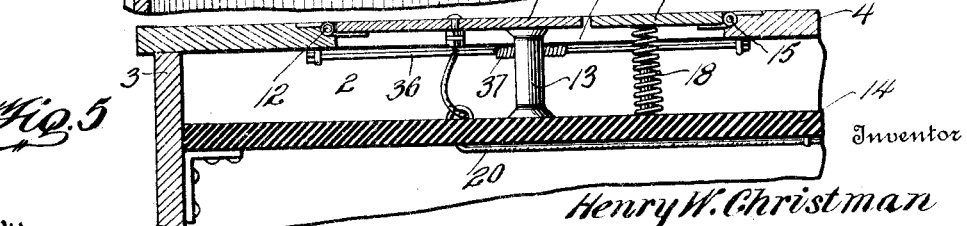

UNITED STATES PATENT OFFICE.

HENRY W. CHRISTMAN, OF BUFFALO, NEW YORK.

ANIMAL-TRAP.

1,034,978.   Specification of Letters Patent.   Patented Aug. 6, 1912.

Application filed July 19, 1911. Serial No. 639,291.

*To all whom it may concern:*

Be it known that I, HENRY W. CHRISTMAN, a citizen of the United States, residing at Buffalo, in the county of Erie and State of New York, have invented new and useful Improvements in Animal-Traps, of which the following is a specification.

This invention relates to animal traps and particularly to such traps that are designed principally for catching rats, mice and similar rodents, the object of the invention being to provide a trap to be self set and ever set and which will include means for positively trapping the animal and killing the same.

Other objects of the invention are to provide positive and negative electric contacts disposed in the path of the animal so that as it enters the trap it will be compelled to close the contacts to thereby close the electric circuit and to cause the animal to be quickly electrocuted; further, the provision of a receiving chamber which is located in such proximity with respect to the contacts that the animal on jumping, through the effect of the electric current, will fall thereinto to be concealed from the view of other animals which will later enter the trap.

In the drawings, forming a portion of this specification and in which like numerals of reference indicate similar parts in the several views:—Figure 1 is a perspective view of the trap. Fig. 2 is a longitudinal section therethrough. Fig. 3 is a transverse section through the same. Fig. 4 is a plan view of a portion of the trap. Fig. 5 is a section on line 5—5 of Fig. 4. Fig. 6 is a bottom plan view of the top of the trap.

The trap comprises a receptacle which preferably includes a base or bottom portion 1, the side walls 2, the end walls 3, and a top 4. The receptacle is divided into compartments 5 and 6 by the partition 7, the compartment 5 being designed for the reception of a transformer which may be connected with any suitable outside electric source, or if desired the receptacle may be provided with a suitable electric battery which may be connected in any suitable obvious manner with the transformer. The receptacle is provided at a point above the compartment 5 with a closure 8 to facilitate the introduction of the transformer or the electric battery into the compartment or the removal of the same therefrom. At one side, the receptacle is provided with a similar closure 9 through which the lead wires from the electric source may be extended and operatively connected with the transformer.

The top 4 of the receptacle is provided at the front end of the latter with the negative and positive electric elements 10 and 11 each being in form of a copper plate, the plate 11 being considerably longer than the plate 10. The plate 11 is hinged, at 12, to the top 4 and it is adapted to be sustained in a horizontal position by means of the metallic post 13 which rises from the support 14. This support is mounted in any suitable well known manner in the receptacle and is formed of non-conducting material. The plate 10 is hinged, at 15, to the receptacle and is disposed substantially in a plane with the plate 11. This plate carries a contact 16 which is normally spaced from the contact 17 by means of a light extensile spring 18. A lead wire 19 is connected at one end to the contact 17, the opposite end of the wire being operatively connected with the transformer. The contact 17 is securely supported upon the insulated support hereinbefore described. The lead wire 20 is connected at one end to the positive contact 11 and at the opposite end the wire is connected with the transformer. This construction is such that when the negative and positive elements 10 and 11 are bridged by the animal stepping upon them the electric circuit will be closed and the animal electrocuted.

At the front end, the receptacle is provided with a substantially U-bail 21 with which the hook 22 on the underside of the inclined approach 23 may be connected so as to hold the latter operatively positioned with respect to the contact elements 10 and 11 and cause the animal to travel in the direction of said elements.

A combined hood and bait container is positioned above the elements 10 and 11 and the trap doors 24 and 25. This hood comprises the front and rear walls 26 and 27, the end walls 28, and the top wall 29. The front wall of the hood is provided with a swinging closure 30 which is disposed in line with the contact elements 10 and 11, it being the object to open the door so as to provide access to the hood when the trap is in use. The rear wall of the hood is provided with an opening 31 over which is extended a foraminous member 32. The hood is provided with a bait container 33 which extends downwardly against one side of the foraminous member so that the bait can be viewed by the animal from the outside of the trap. Parallel rods 34 are supported within the hood and mounted thereon are the swinging aprons 35. These aprons are located at the sides of the contact elements 10 and 11 and are provided for the purpose of concealing the trap doors 24 and 25 and for causing the animal to travel in the direction of the bait which will necessitate his passage across the contact elements 10 and 11. The aprons are free to swing inwardly under the weight of the animal as it falls from the contact plates 10 and 11 so that the animal will finally fall upon one or the other of the trap doors and be delivered to the receiving chamber formed by the compartment 6 of the receptacle. The trap doors are mounted hingedly on the rods 36. These rods are supported by the top 4 of the receptacle and they are partly embraced by springs 37. These springs are engaged with the doors so as to normally sustain them in horizontal positions. Movement of the doors under the tension of the springs is limited by the stops 38 which are carried by the top 4 of the receptacle.

By constructing the hood as hereinbefore described it will be seen that the same may be readily swung to assume the dotted line position shown in Fig. 2 of the drawings so as to facilitate the application of the bait to the bait container. In addition to the bait container hereinbefore described it is desirable to provide such bait hooks as those shown at 39 and to mount the hooks on the apron supporting rods.

The hood is provided with hooks 40 which may be engaged in the eyes 41 on the top 4 so as to hold the hood against swinging movement. The receptacle forming the trap is provided with suitable handles 42 whereby the trap may be readily carried from place to place when desired. One of the side walls of the receptacle is provided with a door 43 so that access can be gained to the receiving compartment 6 when it is desired to remove the dead animal.

I claim:—

1. An animal trap including a receptacle, a fixed electric element, a depressible electric element, means adapted to yieldingly support said depressible element, a fixed contact mounted below the depressible element, a source of electric supply, a connection between said supply and the fixed element, a connection between said supply and the fixed contact, a contact carried by the depressible element and adapted to engage the fixed contact when the element to which it is connected is depressed so as to close the electrical connection between the depressible element and the source of electric supply, and trap doors so disposed that the animal will fall into the receptacle upon electrocution.

2. An animal trap including a receptacle, a fixed electric element, a depressible electric element, means adapted to yieldingly support said depressible element, a fixed contact mounted below the depressible element, a source of electric supply, a connection between said supply and the fixed element, a connection between said supply and the fixed contact, a contact carried by the depressible element and adapted to engage the fixed contact when the element to which it is connected is depressed so as to close the connection between the same and the source of electric supply, trap doors so disposed that the animal will fall into the receptacle upon electrocution, a movable hood supported by the receptacle and disposed above the said trap doors and the electric element, movable aprons supported by said hood and so suspended as partially to conceal the trap doors and guide the animal in the direction of the electric element, and bait hooks carried by the movable apron supports and maintained in interposed relation thereto and on each side of the depressible electric element so that the animal will pass over the edge of the same, the aprons yielding to pressure and allowing the animal to fall through the trap doors.

In testimony whereof I affix my signature in presence of two witnesses.

HARRY W. CHRISTMAN.

Witnesses:
 FRANCES M. HALEY,
 EDNA NOSTRANT.